Jan. 2, 1923.
1,440,685

B. V. KORVIN-KROUKOVSKY.
INTERNAL COMBUSTION ENGINE.
ORIGINAL FILED FEB. 4, 1919.

WITNESS
Wm F. Drew

INVENTOR
Boris V. Korvin-Kroukovsky
BY
Booth & Booth
ATTORNEYS

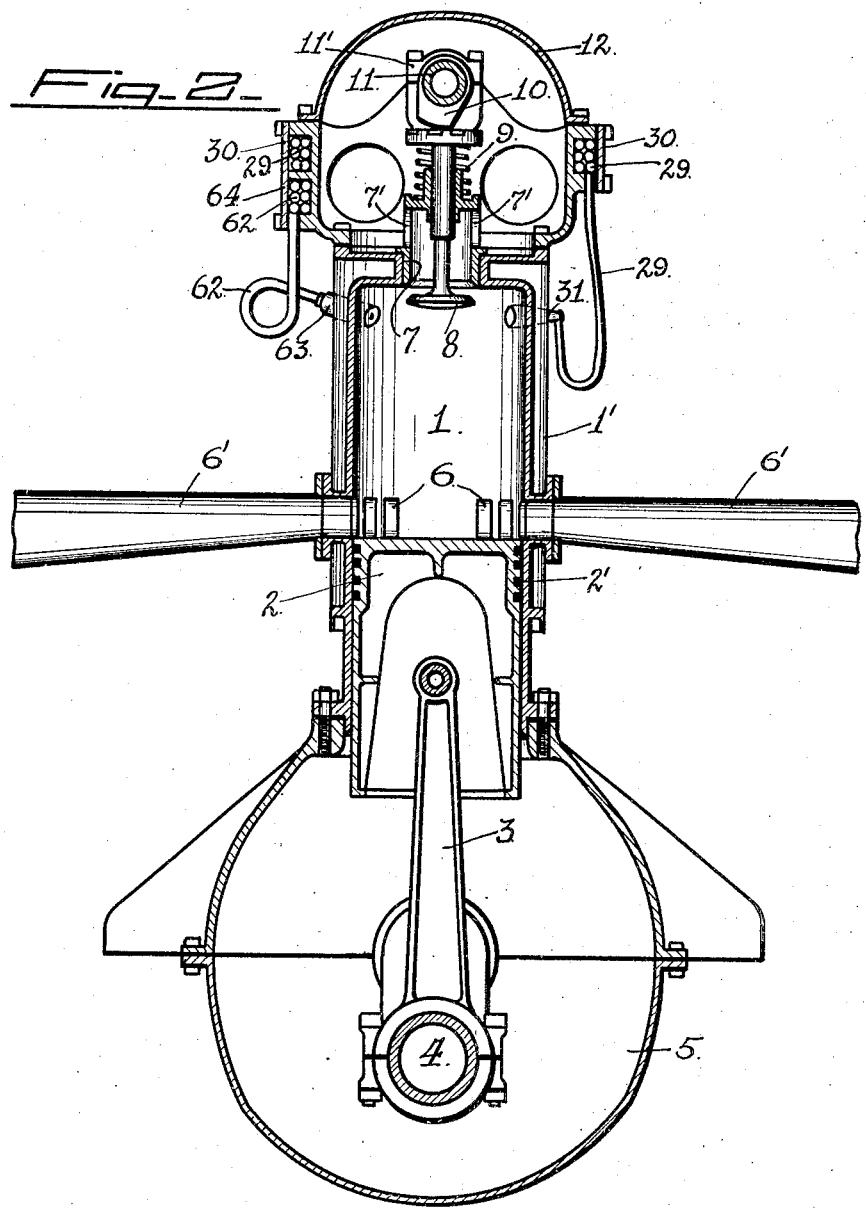

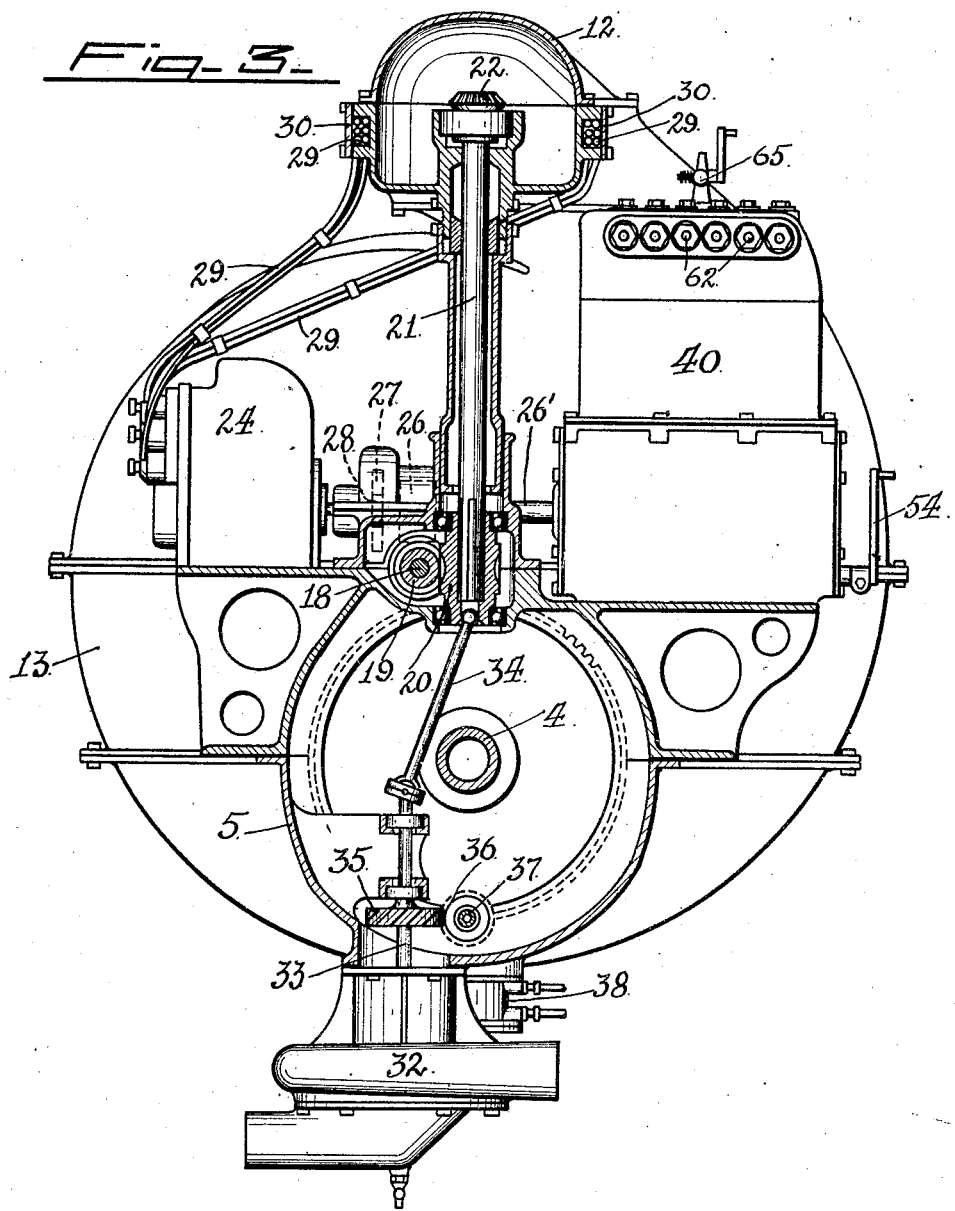

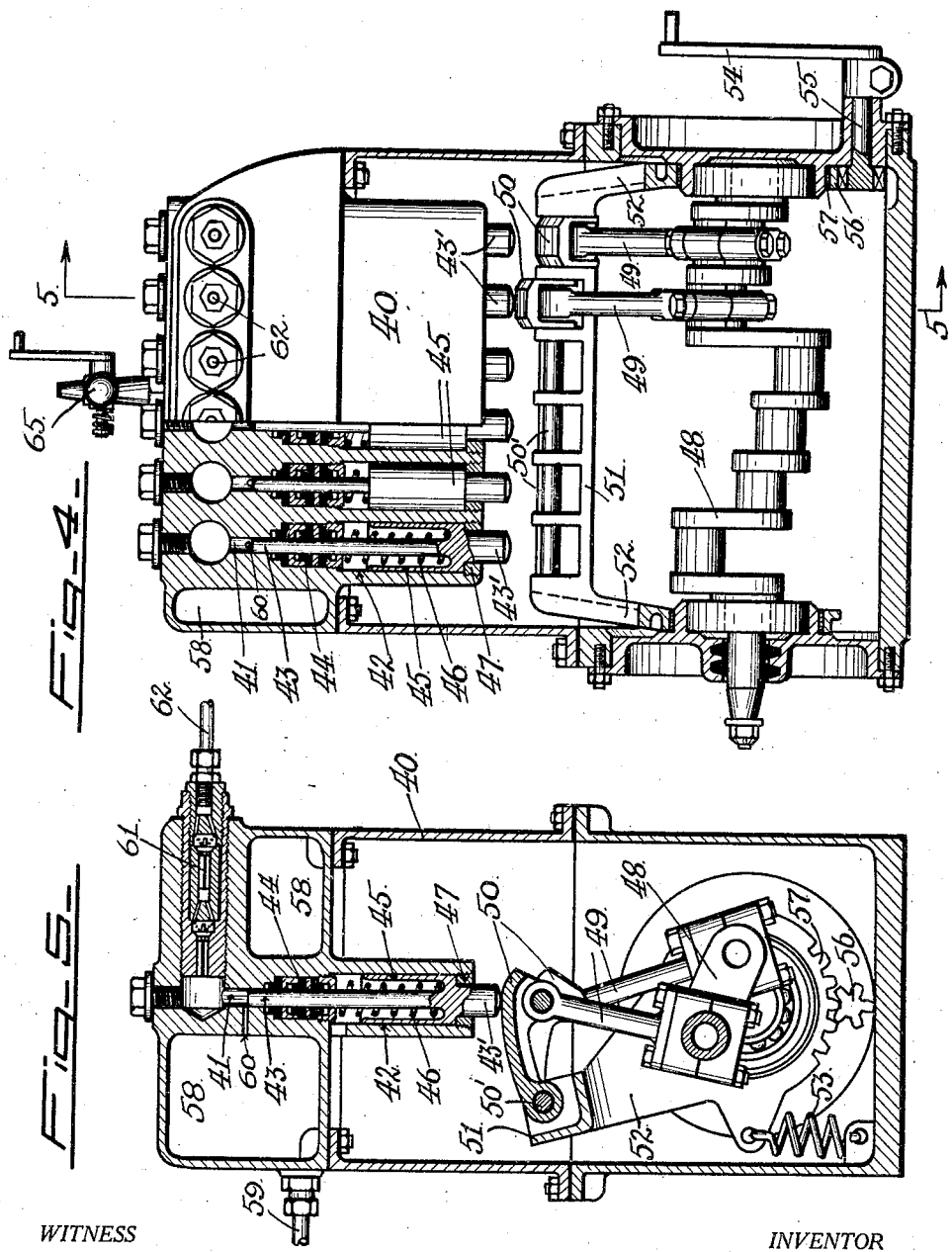

Patented Jan. 2, 1923.

1,440,685

UNITED STATES PATENT OFFICE.

BORIS V. KORVIN-KROUKOVSKY, OF BERKELEY, CALIFORNIA.

INTERNAL-COMBUSTION ENGINE.

Application filed February 4, 1919, Serial No. 274,851. Renewed April 7, 1922. Serial No. 550,420½.

*To all whom it may concern:*

Be it known that I, BORIS V. KORVIN-KROUKOVSKY, a citizen of Russia, residing at Berkeley, in the county of Alameda and State of California, have invented certain new and useful Improvements in Internal-Combustion Engines, of which the following is a specification.

My invention relates to internal combustion engines, of a type particularly suitable for use in self-propelled vehicles and airplanes, though its principles are applicable to stationary engines as well.

The object of my invention is to provide an engine of the described type which has a relatively great amount of power in proportion to its weight. To accomplish this object, I employ the well known two-stroke-cycle principle; but by means of the various novel features of my invention, which are hereinafter fully described, I secure a very high volumetric efficiency; that is to say, for given cylinder dimensions, I am enabled to provide the greatest possible amount of combustible charge in the cylinder, and I am further enabled to provide a charge of such quality that the greatest possible amount of power can be obtained from the combustion thereof.

It is well known in the art that the efficiency of an internal-combustion engine depends largely upon the extent to which the products of combustion, or exhaust gases, are removed from the cylinder before the admission of the fresh charge of combustible gas; for the presence of exhaust gases in the cylinder dilute by just so much the fresh charge. In the engine embodying my invention, there is provided means for completely expelling the exhaust gases from the cylinder prior to the admission of the fresh charge thereinto; and furthermore, the fresh charge is admitted to the cylinder under a pressure greater than atmospheric, so that a relatively greater amount of gas is supplied to the cylinder than is the case in an engine of the commonly used four-stroke-cycle type, in which the fresh charge is admitted to the cylinder at a pressure less than atmospheric. The accomplishment of these two results in an engine of the two-stroke-cycle type provides greater fuel efficiency per unit weight than is secured in engines of any of the commonly used forms.

My invention, as described and illustrated herewith, is embodied in an engine of the six cylinder, vertical, airplane type, although it is to be understood that such factors as the number and arrangement of cylinders, and the use for which the engine is built, are immaterial to the essence of the invention, and that said invention may be embodied in an internal-combustion engine of any form or design.

With this in view, my invention will be fully described with reference to the accompanying drawings, in which:

Fig. 2 is a cross section, enlarged, taken in the direction of the arrows on the line 2—2 of Fig. 1.

Fig. 3 is a cross section, enlarged, taken in the direction of the arrows on the line 3—3 of Fig. 1.

Fig. 4 is a sectional view, enlarged, and partly in elevation, of the fuel injection pump member of my engine.

Fig. 5 is a sectional view taken in the direction of the arrows on the line 5—5 of Fig. 4.

Figure 1:
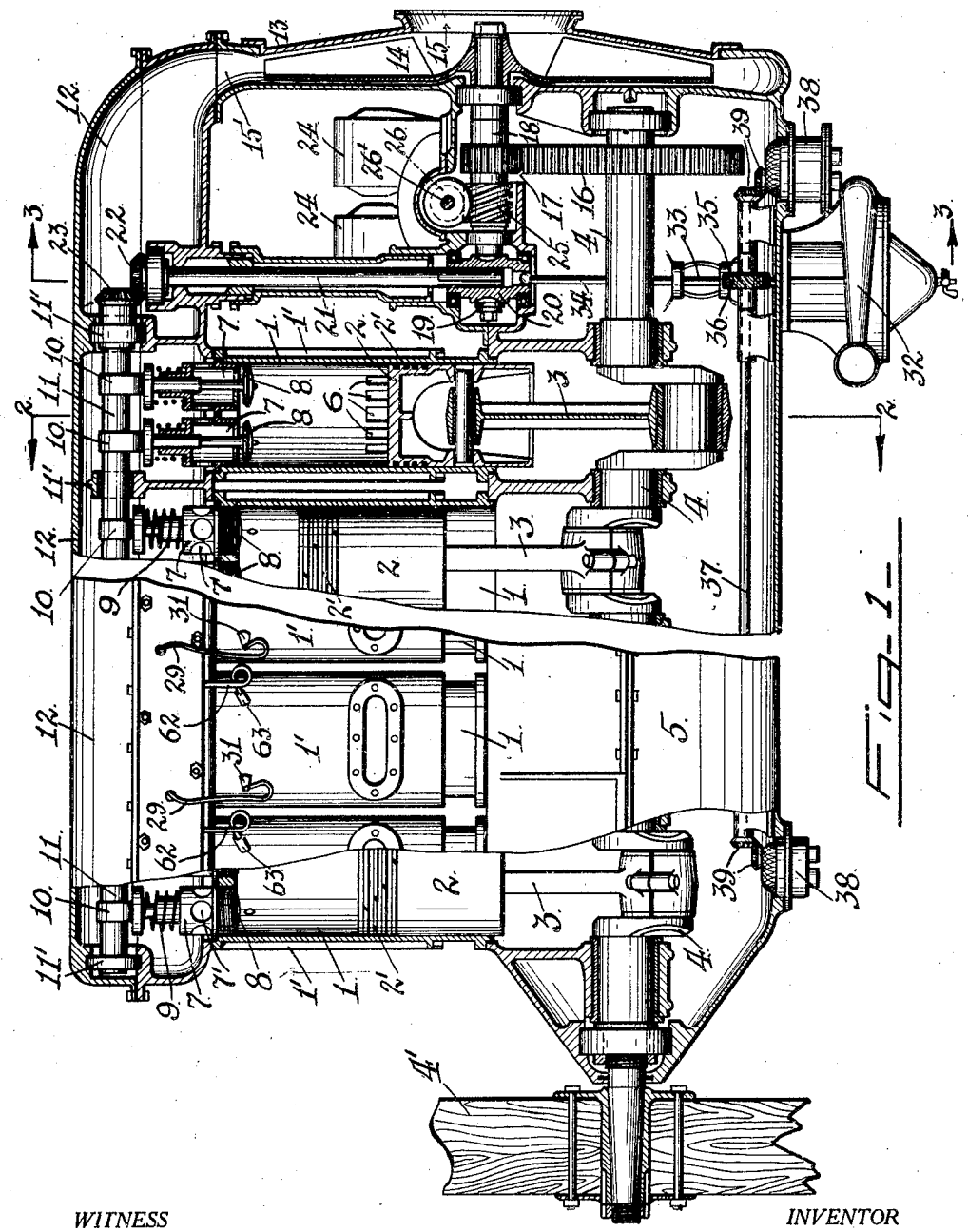
Fig. 1 is a longitudinal side view of my engine, partly in section and partly broken.

In the drawings, the reference numeral 1 is used to designate the several cylinders of my engine. As before stated, the engine will be described as having six cylinders, although in Fig. 1 of the drawings there are shown but three complete cylinders are parts of two others. Each cylinder 1 is surrounded by a suitably constructed jacket 1', the said jacket inclosing a space surrounding the cylinder through which a cooling medium, not illustrated, may be passed. Within each cylinder is a piston 2, of usual construction, and provided with suitable packing rings 2'. The pistons 2 carry connecting rods 3, each journalled at one end within the piston and at the other upon the crank shaft 4, the said crank shaft being supported in the usual manner within the crank case 5. One end of the crank shaft 4 projects through the wall of the case 5, and is adapted to carry and drive a propeller 4'.

Exhaust ports 6, in position for control by the piston near the lower limit of its stroke, are formed in the wall of each cylinder, the said ports providing a free passage for the exhaust gases into suitable exhaust pipes shown at 6', in Fig. 2. Into the head of each cylinder are inserted two valve cages 7, Figs. 1 and 2, the said cages carrying inwardly opening poppet valves 8. Said valves are normally held closed by springs 9, and are opened by means of cams 10 carried by a longitudinally disposed cam-shaft 11, the latter being mounted in bearings 11' within an inclosed housing 12 positioned longitudinally above the cylinders, and extending the entire length of the engine.

As illustrated in Fig. 1, the cams 10 are so set upon the cam shaft 11 that both valves 8 of any one cylinder are operated simultaneously, the purpose of said valves being to admit air, at the proper time in the cycle of operation, to the cylinder 1 from the chamber or duct formed by the walls of the housing 12. The valve cages 7 are formed with suitable orifices 7' for the passage of the air.

The pistons and connecting rods are of the type commonly used in airplane engines. The six-throw crank-shaft has its cranks relatively positioned 60 degrees apart, since a power stroke occurs in each cylinder at each revolution of the crank shaft. The order of firing, and the position of the cranks upon the crank-shaft, is determined by conditions of balance, and is preferably as follows: 6—1—4—3—5—2.

At the end of the engine opposite the propeller 4' is positioned a rotary air pump of the centrifugal type, comprising a shell 13 and a runner 14, Fig. 1. The said shell 13 has a centrally disposed air intake opening 15, and a radially disposed air exhaust opening 15', the latter being connected with the downwardly turned tubular end of the cam shaft housing 12. Thus a continuous air passage is provided from the air pump shell 13, through the housing 12, and the valves 8, to the cylinders 1.

The air pump runner 14 is driven, at a relatively high rate of speed, by means of a gear 16 upon the engine crank shaft 4, said gear meshing with a smaller gear 17 fixed upon the air pump shaft 18. The said air pump shaft also drives the cam shaft 11 by means of worm gears 19 and 20, a vertical shaft 21, and bevel gears 22 and 23. Furthermore, the air pump shaft 18 is used to drive a pair of simultaneously operating magnetos 24, by means of worm gears 25 and 26, the latter being mounted upon a transverse shaft 26', and the said transverse shaft 26' carrying a gear 27, Fig. 3, which meshes with and drives the pinions 28 mounted one upon the shaft of each magneto 24.

The said magnetos 24 may be of any suitable type capable of furnishing an electric current of sufficiently high voltage to supply the needs of the well known form of jump-spark ignition system. The ignition current is led through suitably insulated conducting wires 29, Figs. 1, 2 and 3, said wires being carried in conduits 30 formed in the sides of the cam-shaft housing 12, to the several spark plugs 31, Figs. 1 and 2. These spark plugs are of the usual type, and are inserted in the walls of the cylinders above the upper limit of piston travel, there being two such spark plugs in each cylinder, although but one appears in the drawings. As before stated, the two magnetos operate simultaneously to produce two simultaneous igniting sparks in each cylinder, partly for the purpose of providing for the more rapid combustion of the charge, and partly to provide a factor of safety in the event of the failure of one magneto.

The gearing above described is so proportioned that the cam shaft 12 rotates at the speed of the crank shaft 4, and that the magnetos 24 are driven at the proper speed to fire the several charges within the cylinders in the proper time and sequence.

A rotary pump for circulating the cooling water is positioned beneath the crank case, as shown at 32 in Figs. 1 and 3. The runner of said pump (not shown) is carried upon a vertical shaft 33, and is driven from the vertical shaft 21 by means of a universally jointed shaft 34. The said pump shaft 33 also carries a spiral gear 35, which meshes with and drives a similar gear 36 fixed upon a horizontal shaft 37, longitudinally disposed in the lower part of the crank case 5, and the latter shaft drives two lubricating oil pumps 38, Fig. 1, through suitable bevel gears 39. The pipes, connections, and other necessary members of the cooling and lubricating systems are not shown in the drawings, such members being of any standard construction.

A fuel injection pump, shown at 40 in Fig. 3 and in detail in Figs. 4 and 5, is mounted at the air-pump end of the engine and is driven from the transverse shaft 26'. Said fuel pump, as shown in Figs. 4 and 5, has a plurality of vertical cylinders 41, one corresponding to each of the engine cylinders, the said pump cylinders being enlarged at their lower ends to form cylindrical cross head guides 42. Within each such pump cylinder is a piston 43, passing through packing 44, and carried and guided by a cylindrical cross head 45, working in the cross head guide 42. A spring 46, surrounding the piston 43, forces the latter downwardly against a limiting removable collar 47.

The transverse shaft 26', Fig. 3, is suitably coupled to a six-throw crank shaft 48, Figs. 4 and 5, journalled in the lower portion of the fuel pump. Upon each crank of said pump crank shaft 48 is journalled a connecting rod 49, the upper end of which is pivotally connected with one end of a rocker arm 50. The other ends of said rocker arms are pivotally mounted upon a common movable carrier member 51, whose depending arms 52 are journalled concentrically with respect to the pump crank shaft 48. The upper surfaces of the rocker arms 50 are adapted to bear against the lower projecting ends 43' of the pump pistons 43. Thus the vertical component of the motion of the connecting rods 49 is transmitted to the pistons 43 through the rocker arms 50 acting as levers fulcrumed at 50', Fig. 5. When said rocker arms are held in the lateral position shown in Fig. 5 by the carrier member 51, so that the upper end of each connecting rod 49 is substantially in vertical alignment with its corresponding piston 43, the maximum stroke is imparted to said piston, and when the said carrier member is moved to the right as viewed in Fig. 5, so that the fulcrum 50' of said rocker arm 50 is in vertical alignment with the piston 43, said piston is not moved at all. Obviously, any desired length of stroke of the piston 43, between zero and the maximum, may be obtained by movement of the carrier member 51, and as said carrier member is common to all the rocker arms, the strokes of all pistons will be varied simultaneously. A spring 53, Fig. 5, normally holds the carrier member 51 in the position shown, from which position it may be moved by means of a lever 54, Fig. 4, acting through a shaft 55 and a pinion 56 which meshes with a gear segment 57 formed in the lower portion of one of the carrier member arms 52, as shown in Fig. 5.

The cylinders 41 of the fuel injection pump are partially surrounded by a fuel intake chamber 58, Figs. 4 and 5, into which the fuel is conducted through a pipe shown in part at 59, in Fig. 5. Intake passages 60 lead from the fuel chamber 58 to the several pump cylinders, the fuel being drawn into said cylinders through said passages upon the downward strokes of the pump pistons 43. From the pump cylinders the fuel is ejected, upon the upward strokes of the pistons 43, through suitably constructed check valves 61 and pipes 62 to injection nozzles 63, Figs. 1 and 2, in the engine cylinders. The pipes 62, one of which leads to each engine cylinder, are carried in a conduit 64, Fig. 2, formed in the side of the cam shaft housing 12, adjacent to one of the ignition wire conduits 30. A pet cock 65, Figs. 3 and 4, is provided in the upper portion of the pump fuel chamber 58, to permit the escape of any air that may find its way into said chamber in sufficient quantities to obstruct the free flow of fuel. The shaft 48 of the fuel pump is driven, by the means described, at the speed of the engine crank shaft, so that a charge of fuel, depending in quantity upon the setting of the pump stroke adjusting lever 54, is injected into each engine cylinder at each revolution of the engine crank shaft.

The operation of the engine may be briefly described as follows, regarding one cylinder as typical of the whole, and with the understanding that the cycles of the remaining cylinders follow at angular intervals of 60 degrees. The ignition spark occurs at or slightly before the piston reaches its upper limit of travel, igniting the charge. As the piston moves downwardly upon its power stroke, following the combustion and consequent expansion of the charge, it uncovers, near the lower limit of its stroke, the exhaust ports 6, Figs. 1 and 2. The exhaust gases, still under considerable pressure, escape through said exhaust ports, and immediately thereafter, or in practice as soon as the pressure within the cylinder falls below that of the air forced by the air pump 14, Fig. 1, into the inclosed cam shaft housing 12, the air inlet valves 8 are opened. During that portion of the stroke in which the exhaust ports 6 remain uncovered, fresh air is forced into and through the cylinder by the air pump 14, thus completely scavenging the cylinder of all exhaust products, and filling the said cylinder with a fresh charge of air. The air inlet valves close immediately after the exhaust ports 6 are closed by the upward movement of the piston, and at the same time a charge of liquid fuel is injected into the cylinder by the fuel pump. The charge of mixed fuel and air is then compressed by the upward travel of the piston, and fired by the spark as the said piston reaches its upper limit of travel.

Vaporization of the fuel is effected primarily by the heat within the cylinder. The fuel is atomized to a considerable extent by being injected into the cylinder through the injection nozzle, and is therefore easily vaporized, partly by the heat of the air within the cylinder, said air having already been heated by contact with the hot valves and cylinder walls, and further by the heat of compression. The vaporized fuel is effectively mixed with the air by the compression thereof, to form a homogeneous mixture.

As has been stated, the superior efficiency of my engine depends largely upon two factors, viz—the complete removal of all exhaust gases, and the introduction into the cylinder of a maximum quantity of air for the combustible charge, said air being introduced under a pressure greater than atmospheric. Both of these results are accomplished by the use of the exterior air pump, and, furthermore, the use of said air pump enables me to introduce, compress, and fire a complete charge at each revolution of the crank shaft, i. e. to make use of the well known two-stroke-cycle principle, without any diminution of volumetric efficiency.

I claim:—

1. An internal combustion engine comprising a cylinder having an open end and an opposite closed head, said cylinder having an exhaust port in its wall in the region of said open end; a piston operatable within said cylinder adapted to control said exhaust port; a valve in the head of said cylinder adapted to admit air to the interior thereof; an air pump; an inclosed housing forming a duct for the passage of the air from said air pump to said valve; means within said housing for operating said valve in timed relation to the movement of said piston; means for injecting a quantity of liquid fuel into said cylinder in timed relation to the movement of said piston; and means for igniting said fuel.

2. An internal combustion engine comprising a cylinder having an open end and an opposite closed head, said cylinder having an exhaust port in its wall in the region of its open end; a piston operatable within said cylinder adapted to control said exhaust port; a valve in the head of the cylinder adapted to admit air to the interior thereof; a crank shaft driven by the piston; an air pump driven by the crank shaft; a housing forming a duct for the air from the air-pump to the valve in the head of the cylinder; a cam-shaft in the air duct housing driven by the air pump shaft for operating said valve in timed relation to the piston movement; means for injecting a quantity of liquid fuel into said cylinder in timed relation to the movement of said piston; and means for igniting said fuel.

3. An internal combustion engine comprising a cylinder having an open end and an opposite closed head, said cylinder having an exhaust port in its wall in the region of its open end; a piston operatable within said cylinder adapted to control said exhaust port; a valve in the head of the cylinder adapted to admit air to the interior thereof; a crank shaft driven by the piston; an air pump driven by the crank shaft; a housing forming a duct for the air from the air-pump to the valve in the head of the cylinder; a cam-shaft in the air duct housing driven by the air pump shaft for operating said valve in timed relation to the piston movement; a fuel injection pump driven by the engine crank shaft and having a nozzle attachment for spraying liquid fuel into the cylinder in timed relation to the piston movement; and an electric ignition system to ignite said fuel in the cylinder.

4. An internal combustion engine comprising a cylinder having an open end and an opposite closed head, said cylinder having an exhaust port in its wall in the region of its open end; a piston operatable within said cylinder adapted to control said exhaust port; a valve in the head of the cylinder adapted to admit air to the interior thereof; a crank shaft driven by the piston; an air pump driven by the crank shaft; a housing forming a duct for the air from the air-pump to the valve in the head of the cylinder; a cam-shaft in the air duct housing driven by the air pump shaft for operating said valve in timed relation to the piston movement; a fuel injection pump driven by the engine crank shaft and having a nozzle attachment for spraying liquid fuel into the cylinder in timed relation to the piston movement; means for regulating said fuel injection pump to vary the charge of fuel supplied; and an electric ignition system to ignite said fuel in the cylinder.

In testimony whereof I have signed my name to this specification in the presence of two subscribing witnesses.

BORIS V. KORVIN-KROUKOVSKY.

Witnesses:
WM. F. BOOTH,
D. B. RICHARDS.